US012024929B2

(12) United States Patent
De Meulenaere et al.

(10) Patent No.: US 12,024,929 B2
(45) Date of Patent: Jul. 2, 2024

(54) SECURITY APPARATUS HAVING A REMOVABLE LOCK TIP

(71) Applicant: ACCO Brands Corporation, Lake Zurich, IL (US)

(72) Inventors: William De Meulenaere, Newark, CA (US); Michael Otsuka, Sunnyvale, CA (US); Alex Klinkman, Campbell, CA (US); James Kao, Fremont, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 335 days.

(21) Appl. No.: 17/531,020

(22) Filed: Nov. 19, 2021

(65) Prior Publication Data

US 2022/0162886 A1 May 26, 2022

Related U.S. Application Data

(60) Provisional application No. 63/117,159, filed on Nov. 23, 2020.

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01); *E05B 73/0005* (2013.01)

(58) Field of Classification Search
CPC .. E05B 73/00; E05B 73/0005; E05B 73/0082; E05B 37/02; Y10T 70/40; Y10T 70/50; Y10T 70/5009

(Continued)

(56) References Cited

U.S. PATENT DOCUMENTS 4,870,840 A 10/1989 Klein
4,893,488 A 1/1990 Klein
(Continued)

FOREIGN PATENT DOCUMENTS

AU 3394093 A 9/1993
CN 2762203 Y 3/2006
(Continued)

OTHER PUBLICATIONS

European Patent Office Search Report for Application No. 21209341.3 dated May 2, 2022 (14 pages).
(Continued)

*Primary Examiner* — Suzanne L Barrett
(74) *Attorney, Agent, or Firm* — Michael Best & Friedrich LLP

(57) ABSTRACT

A security apparatus includes a lock body, an actuator assembly supported by the lock body, the actuator assembly having an engagement feature configured to rotate between a first position and a second position. The security apparatus further includes a lock tip removably coupled to the lock body. The lock tip is movable by the actuator assembly between a locked position, in which the lock tip is secured to the portable electronic device, and an unlocked position, in which the lock tip is unsecured from the portable electronic device. Rotating the engagement feature from the second position to the first position locks the lock tip to the lock body and concurrently locks the lock tip to the portable electronic device. Rotating the engagement feature from the first position to the second position unlocks the lock tip from the lock body and concurrently unlocks the lock tip from the portable electronic device.

20 Claims, 18 Drawing Sheets

(58) Field of Classification Search
USPC .................................................. 70/14, 57, 58
See application file for complete search history.

(56) References Cited

U.S. PATENT DOCUMENTS

| | | | | |
|---|---|---|---|---|
| 5,687,592 | A | 11/1997 | Penniman et al. | |
| 5,717,571 | A | 2/1998 | Helot | |
| 6,449,992 | B1 * | 9/2002 | Yu | E05B 73/0082 70/426 |
| 6,708,535 | B1 | 3/2004 | Sanders | |
| 6,763,688 | B1 | 7/2004 | Syu | |
| 6,779,370 | B2 | 8/2004 | Bellow, Jr. et al. | |
| 7,302,816 | B1 | 12/2007 | Lu | |
| 7,308,809 | B2 | 12/2007 | Lu | |
| 7,315,443 | B2 | 1/2008 | Allen | |
| 7,441,426 | B2 | 10/2008 | Avganim | |
| 7,549,308 | B2 | 6/2009 | Avganim | |
| 7,997,106 | B2 * | 8/2011 | Mahaffey | E05B 73/00 70/49 |
| 8,001,812 | B2 | 8/2011 | Mahaffey et al. | |
| 8,042,366 | B2 | 10/2011 | Mahaffey et al. | |
| 8,336,344 | B2 | 12/2012 | Senatori | |
| 8,701,452 | B2 | 4/2014 | Foster et al. | |
| 8,844,329 | B2 | 9/2014 | Anderson | |
| 8,991,225 | B2 * | 3/2015 | Wu | E05B 73/0082 70/58 |
| 9,122,449 | B2 | 9/2015 | Desilva et al. | |
| 9,141,145 | B2 | 9/2015 | White et al. | |
| 9,574,378 | B2 * | 2/2017 | Wu | E05B 73/0082 |
| 10,067,533 | B1 | 9/2018 | Powell et al. | |
| 10,718,138 | B2 * | 7/2020 | Wu | E05B 73/0082 |
| 11,187,014 | B2 * | 11/2021 | Kao | G06F 1/1656 |
| 11,203,886 | B2 * | 12/2021 | Wu | E05B 73/0082 |
| 11,680,429 | B2 * | 6/2023 | Kao | G06F 1/1616 361/679.55 |
| 2003/0101778 | A1 | 6/2003 | Carl et al. | |
| 2006/0232926 | A1 | 10/2006 | Homer et al. | |
| 2008/0110217 | A1 | 5/2008 | Andrews et al. | |
| 2012/0312056 | A1 * | 12/2012 | Yu | E05B 73/0082 70/14 |
| 2014/0069153 | A1 * | 3/2014 | Wu | E05B 73/0082 70/58 |
| 2014/0174137 | A1 | 6/2014 | Xue | |
| 2014/0298868 | A1 | 10/2014 | Richards | |
| 2017/0247916 | A1 * | 8/2017 | Kao | E05B 73/0082 |
| 2018/0252003 | A1 | 9/2018 | Klinkman et al. | |
| 2018/0283055 | A1 | 10/2018 | Chen | |
| 2018/0347237 | A1 | 12/2018 | Tse et al. | |
| 2018/0363334 | A1 * | 12/2018 | Wu | E05B 73/0005 |
| 2019/0112840 | A1 * | 4/2019 | Wu | E05B 73/0005 |
| 2020/0080346 | A1 * | 3/2020 | Wu | E05B 73/0082 |
| 2022/0065002 | A1 * | 3/2022 | Wu | E05B 73/0082 |
| 2023/0160236 | A1 * | 5/2023 | Klinkman | E05B 73/0082 70/58 |
| 2023/0243191 | A1 * | 8/2023 | Wang | E05B 73/0082 70/58 |

FOREIGN PATENT DOCUMENTS

| | | | | |
|---|---|---|---|---|
| CN | 114525977 | A * | 5/2022 | E05B 63/0056 |
| DE | 202020103694 | U1 | 7/2020 | |
| WO | 2003052222 | A1 | 6/2003 | |

OTHER PUBLICATIONS

European Patent Office Search Report for Application No. 23159211.4 dated Jun. 14, 2023 (9 pages).

* cited by examiner

SECURITY APPARATUS HAVING A REMOVABLE LOCK TIP

CROSS-REFERENCE TO RELATED APPLICATIONS

The present application claims the benefit of U.S. Provisional Patent Application No. 63/117,159, filed Nov. 23, 2020, the entire contents of which are incorporated herein by reference.

BACKGROUND

The present invention relates to security apparatuses for securing portable electronic devices and, more particularly, to security apparatuses for use with different interfaces on portable electronic devices.

Security apparatuses are commonly used to secure laptop computers, tablet computers, and other portable electronic devices in place. Some security apparatuses are configured to engage and lock in slots formed in the portable electronic devices. Different portable electronic devices may have different shapes and/or sizes of slots.

SUMMARY

In one embodiment, the invention provides a security apparatus for a portable electronic device. The security apparatus includes a lock body, an actuator assembly supported by the lock body, the actuator assembly having an engagement feature configured to rotate between a first position and a second position. The security apparatus further includes a lock tip removably coupled to the lock body. The lock tip is configured to selectively engage the portable electronic device. The lock tip is movable by the actuator assembly between a locked position, in which the lock tip is secured to the portable electronic device, and an unlocked position, in which the lock tip is unsecured from the portable electronic device. Rotating the engagement feature from the second position to the first position locks the lock tip to the lock body and concurrently locks the lock tip to the portable electronic device. Rotating the engagement feature from the first position to the second position unlocks the lock tip from the lock body and concurrently unlocks the lock tip from the portable electronic device.

In another embodiment, the invention provides a security apparatus for a portable electronic device. The security apparatus includes a lock body, an actuator assembly supported by the lock body, the actuator assembly configured to move between a first position and a second position, a lock tip removably coupled to the lock body, the lock tip configured to selectively engage the portable electronic device, wherein the lock tip is movable by the actuator assembly between a locked position, in which the lock tip is secured to the portable electronic device, and an unlocked position, in which the lock tip is unsecured from the portable electronic device, and a retainer coupled to the lock body and separate from the actuator assembly, the retainer configured to move between a holding position in which the retainer holds the lock tip relative to the lock body, and a release position, in which the retainer permits the lock tip to be removed from the lock body.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-5 illustrate a security apparatus 100 embodying the invention. The security apparatus 100 is configured to engage a portable electronic device 104 (FIG. 11) (e.g., a tablet computer, a laptop computer, a smartphone, an mp3 player, an eReader, etc.) to secure the portable electronic device 104 at a location. The illustrated security apparatus 100 includes a lock body 108, a lock tip 112A that is removable from the lock body 108, and an actuator assembly 116.

Figure 2:
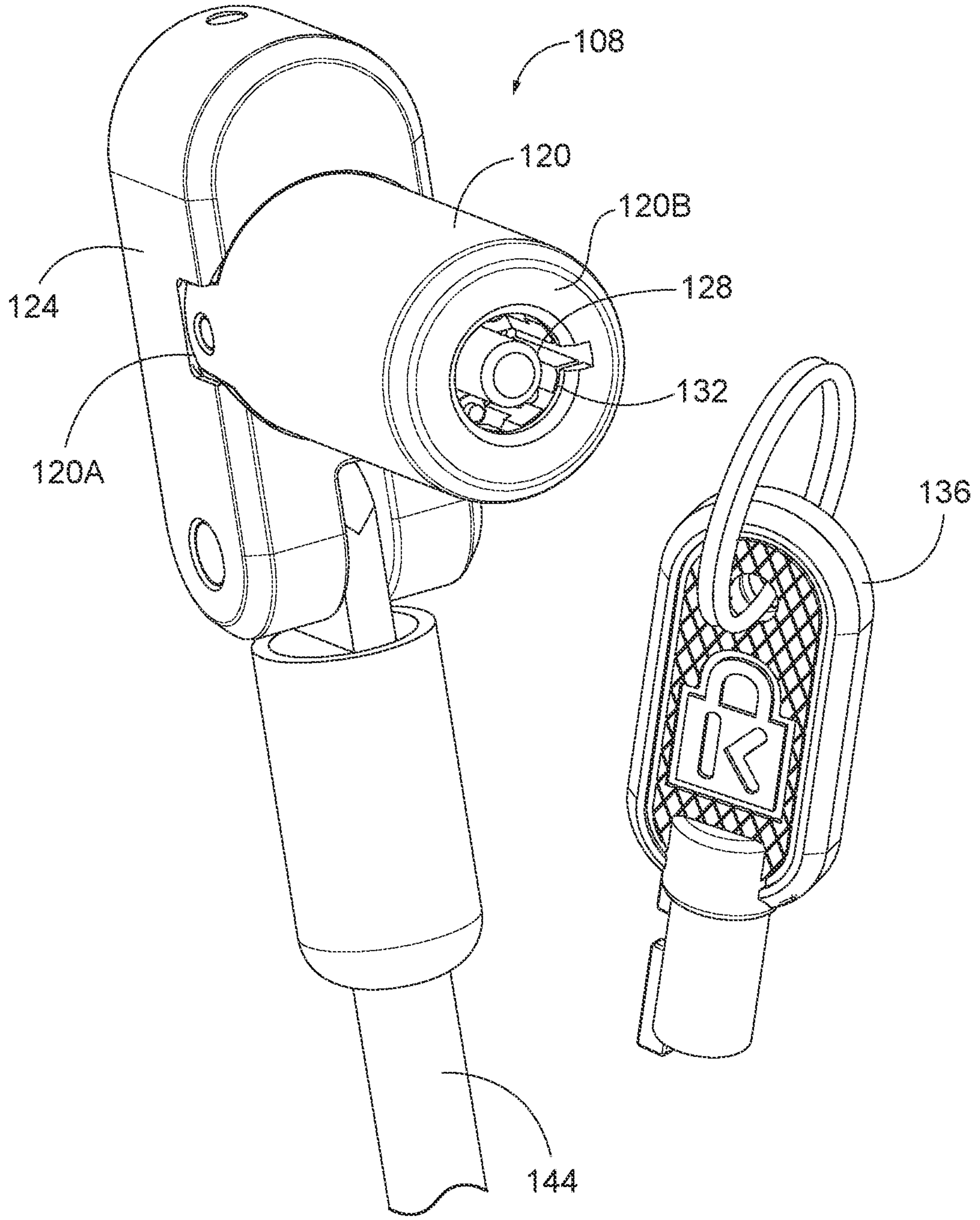
FIG. 2 is a perspective view of the security apparatus of FIG. 1 and a key.
Figure 5:
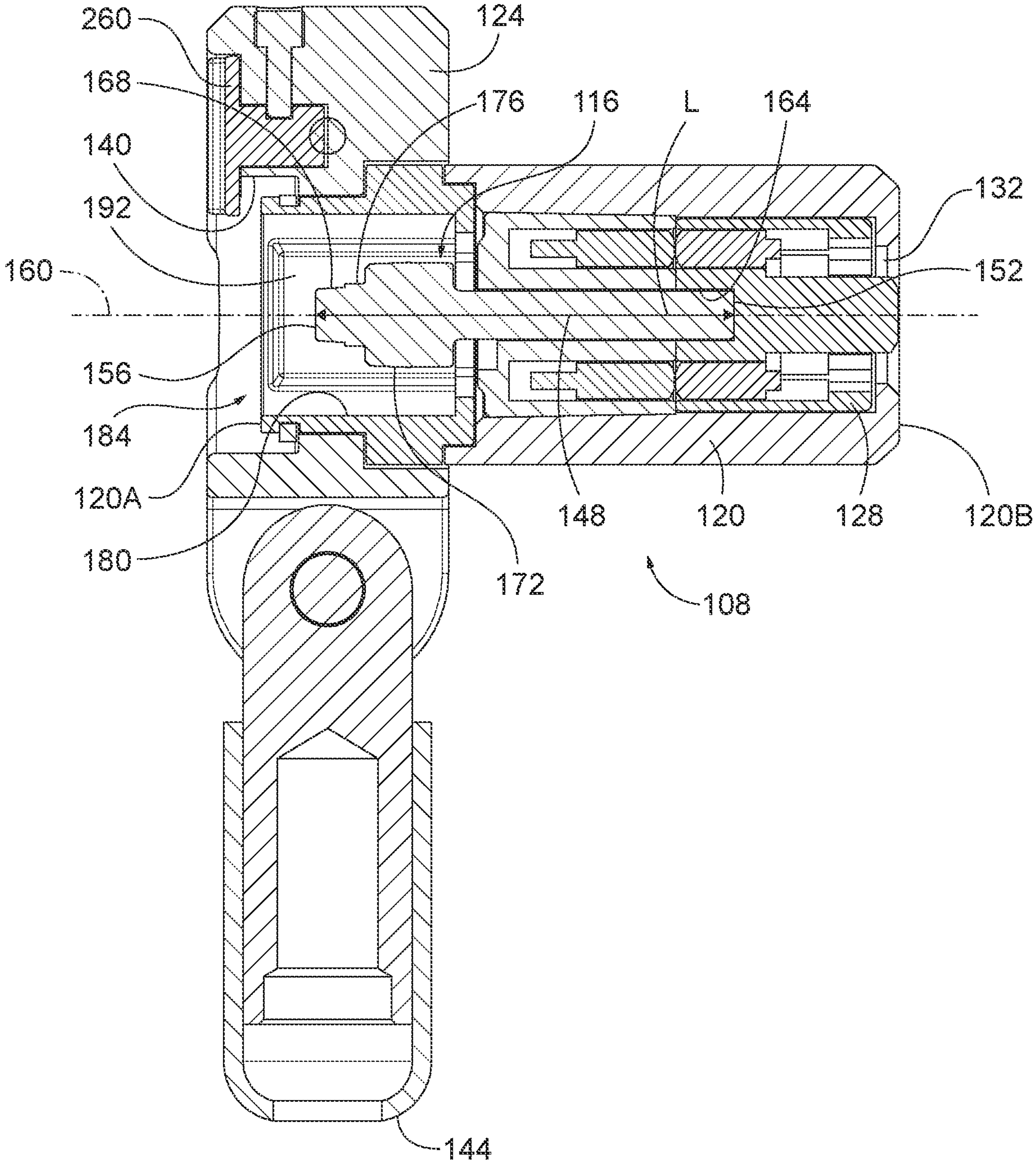
FIG. 5 is a cutaway view of the lock body of the security apparatus of FIG. 1.

The illustrated lock body 108 is generally T-shaped having a first portion 120 extending perpendicular to a second portion 124. The first portion 120 is cylindrical in shape, extending between a first end 120A and a second end 120B, and houses a locking mechanism in the form of a lock cylinder 128 (FIG. 2). The lock cylinder 128 includes an opening 132 at the second end 120B of the first portion 120 for receiving a key 136 as described in greater detail with respect to FIG. 5. The second portion 124 is a dihedron formed of two curving obrounds and defines a chamber 140 for receiving part of the lock tip 112A. The second portion 124 is non-removably coupled to the first portion 120 at the first end 120A of the first portion 120. As shown in FIG. 5, the first portion 120 is received within the chamber 140 of the second portion 124. In some embodiments, the first portion 120 may be rotatable relative to the second portion 124. In other embodiments, the lock body 108 may have other shapes or configurations.

The security apparatus 100 also includes a cable 144. A first end of the cable 144 is coupled to the lock body 108. In the illustrated embodiment, the first end of the cable 144 is coupled to the second portion 124 of the lock body 108. At a second end (not shown), the cable 144 may be coupled to a relatively stationary object such that when the lock tip 112A is coupled to the lock body 108 and to the portable electronic device 104, the portable electronic device 104 is coupled to the relatively stationary object via the security apparatus 100. The relatively stationary object may be a desk, a chair, a bracket, and the like.

Figure 3:
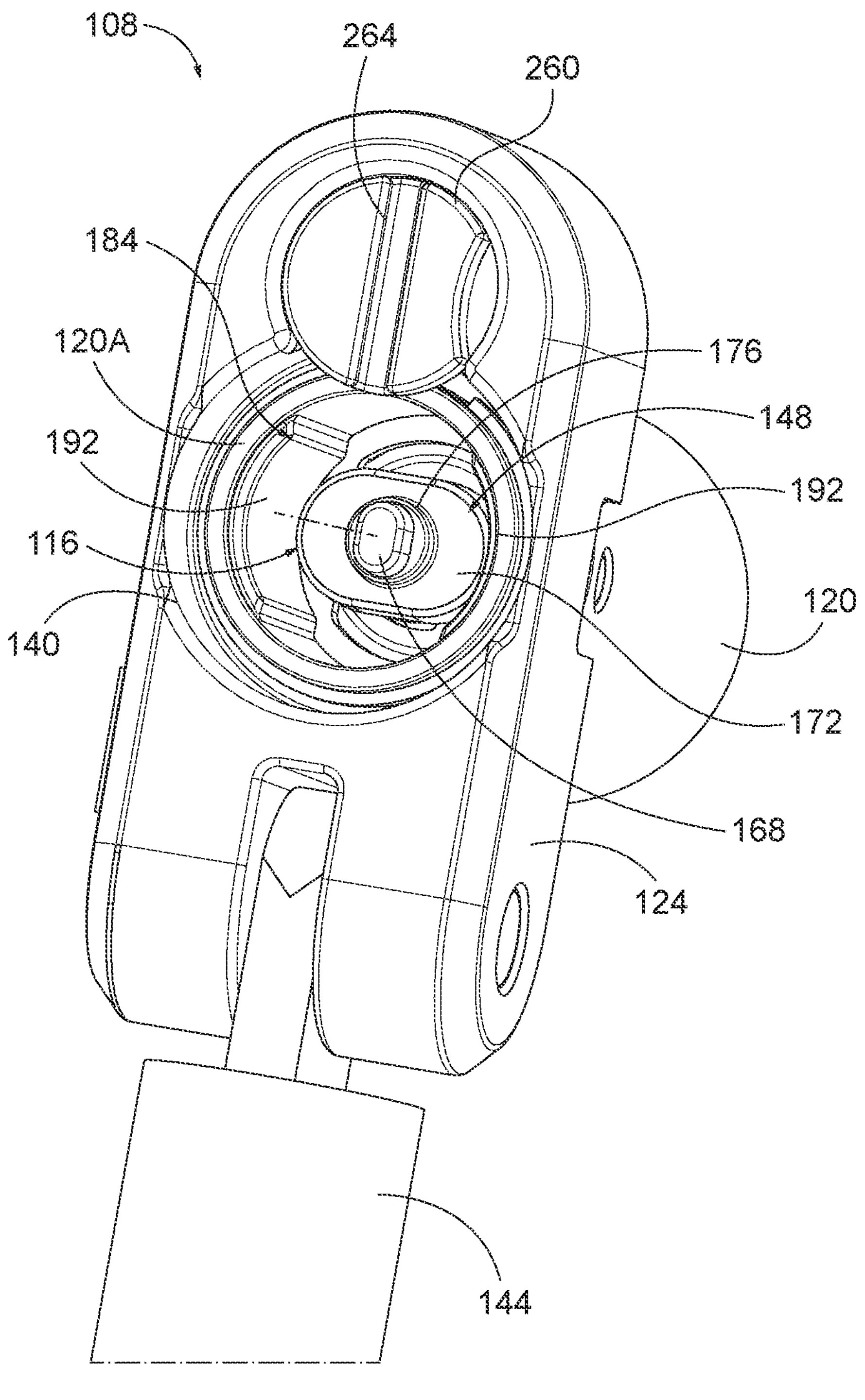
FIG. 3 is a perspective view of the lock body of the security apparatus of FIG. 1.
Figure 4:
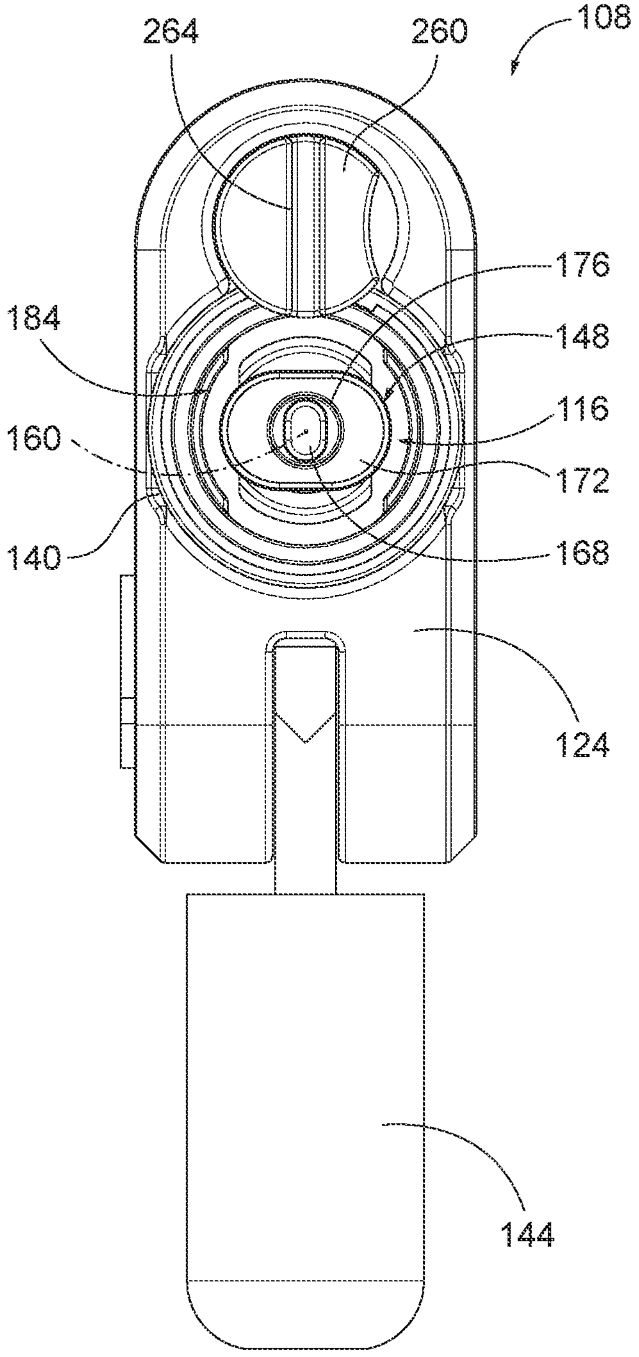
FIG. 4 is a plan view of the lock body of the security apparatus of FIG. 1.

As shown in FIGS. 3-5, the actuator assembly 116 includes a rotatable actuator 148 having a varying cross-section along its length L, the length L (FIG. 5) extending from a first lengthwise end 152 to a second lengthwise end 156. The rotatable actuator 148 is rotatable relative to the lock body 108 (i.e., the first portion 120 of the lock body 108) about a rotational axis 160 extending parallel to the length L of the actuator 148. The first lengthwise end 152 is coupled to the lock cylinder 128 such that rotation of the lock cylinder 128 likewise rotates the rotatable actuator 148 about its rotational axis 160. In the illustrated embodiment, the first lengthwise end 152 extends into an opening 164 of the lock cylinder 128.

The second lengthwise end 156 of the actuator 148 includes a plurality of non-cylindrical engagement features 168, 172 positioned adjacent to one another along the length L of the rotatable actuator 148. The engagement features 168, 172 couple the lock body 108 to the lock tip 112A and assist in transitioning the lock tip 112A between locked and unlocked positions, as described in greater detail below. A first engagement feature 168 has an obround cross-section defined by two semicircles connected via parallel lines. A second engagement feature 172 likewise has an obround cross-section, though rotated a quarter-turn relative to the first engagement feature 168. The second engagement feature 172 has a larger cross-sectional area than the cross-sectional area of the first engagement feature 168 and is located between the first engagement feature 168 and the first lengthwise end 152. As shown in FIG. 4, the cross-sectional area of the second engagement feature 172 (perpendicular to the rotational axis 160) fully surrounds (i.e., encapsulates) the first engagement feature 168. As shown in FIGS. 3-5, a spacer 176 may be located between the first and second engagement features 168, 172 such that the engagement features 168, 172 are spaced apart from one another along the length L of the actuator 148.

As shown, the actuator 148 is formed as a single piece and the first and second engagement features 168, 172 are integrally formed with the portion that is coupled to the lock cylinder 128. In other embodiments, the first and second engagement features 168, 172 may be formed separately and attached to the remainder of the actuator 148

As shown in FIG. 5, the actuator 148 extends from the lock cylinder 128 into a chamber 180 of the first portion 120 of the lock body 108, the chamber 180 being defined by sidewalls of the first portion 120 that are positioned in the chamber 140 of the second portion 124 of the lock body 108. As such, the chamber 180 of the first portion 120 is at least partially located within the chamber 140 of the second portion 124. The chambers 140, 180 are generally cylindrical and are concentric with one another. The first and second engagement features 168, 172 are located within the chamber 180 of the first portion 120, and therefore also located within the chamber 140 of the second portion 124. Collectively, the chambers 140, 180 define a lock tip chamber 184 for receiving the lock tip 112A.

Figure 1:
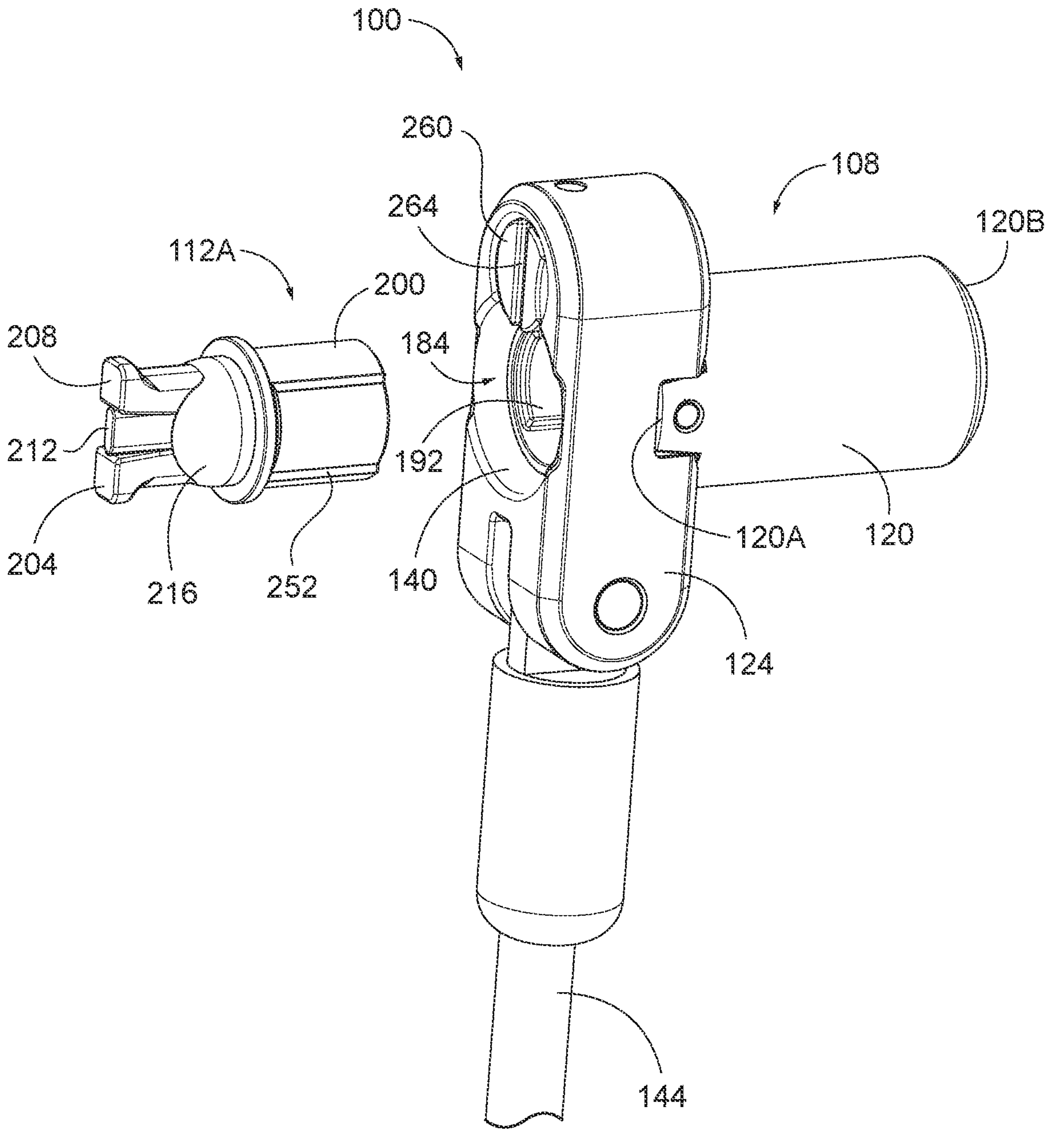
FIG. 1 is a partially exploded perspective view of a security apparatus embodying the invention, the security apparatus including a lock tip, a lock body, and an actuator assembly.

As shown in FIG. 1, the lock tip 112A is insertable into and removable from the lock body 108. More specifically, the lock tip 112A is insertable into and removable from the lock tip chamber 184. The lock tip 112A is shown in greater detail in FIGS. 6-11.

Figure 11:
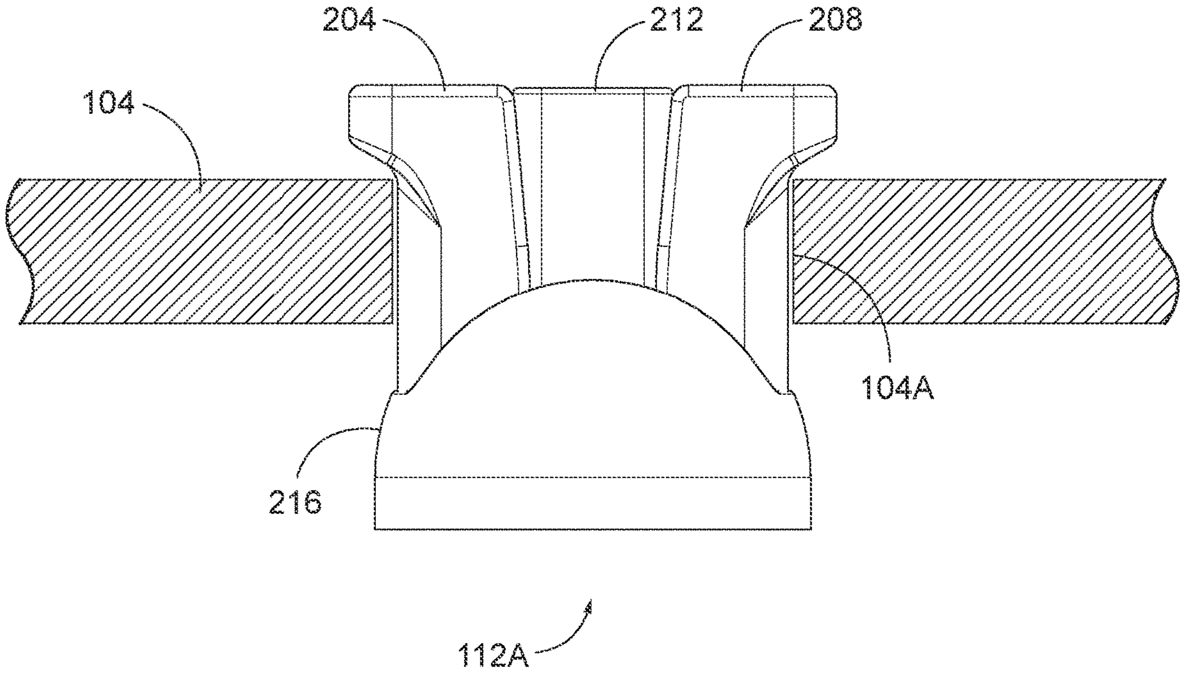
FIG. 11 is a plan view of a portion of the lock tip of the security apparatus of FIG. 1 in a slot of a portable electronic device.
Figure 12:
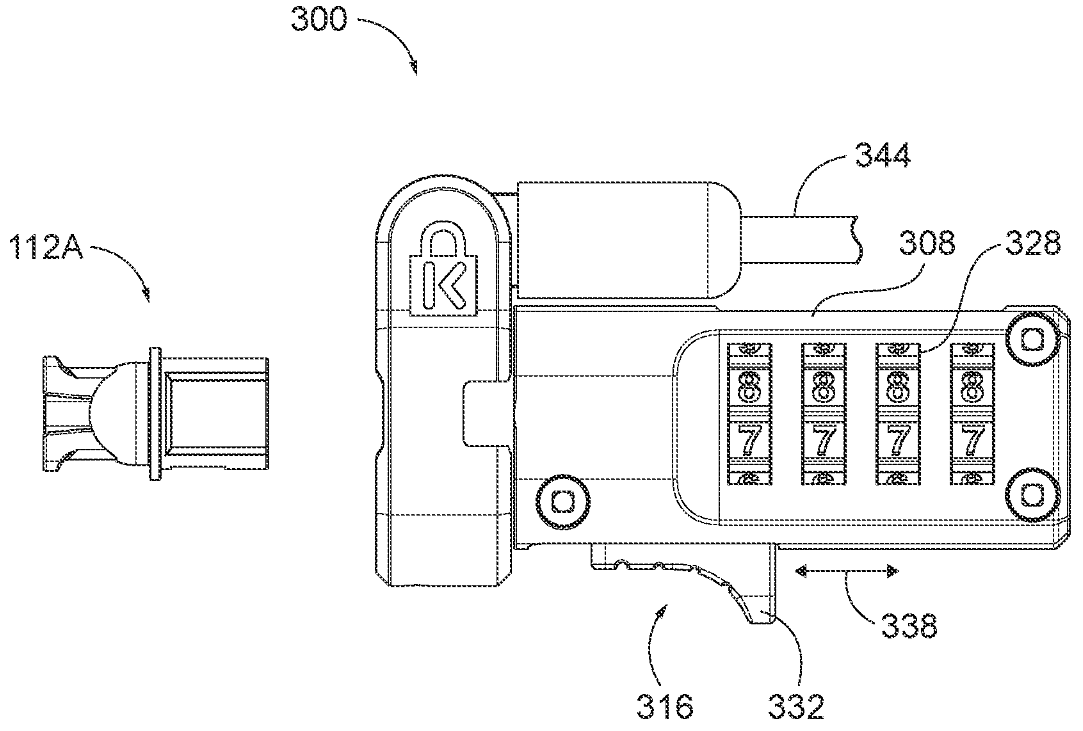
FIG. 12 is a partially exploded side view of a security apparatus embodying the invention, the security apparatus including a lock tip, a lock body, and an actuator assembly.

The illustrated lock tip 112A includes a body 200, first and second expandable fingers 204, 208, and a plunger or paddle 212. The body 200 is cylindrical and is receivable within the lock tip chamber 184. The fingers 204, 208 and the paddle 212 are coupled to and extend outwardly from the body 200. In the illustrated embodiment, the fingers 204, 208 and the paddle 212 extend axially from the body 200 and are generally aligned with the longitudinal axis L when positioned in the lock tip chamber 184. The two fingers 204, 208 are positioned adjacent to and radially outward from the paddle 212. The fingers 204, 208, or tabs or latches, are movable relative to the body 200 between an unlocked position and a locked position by actuation of the paddle 212, as described in greater detail below. An elastomeric element (e.g., an O-ring or rubber band) may surround the fingers 204, 208 to help bias the fingers 204, 208 toward the paddle 212 and toward the unlocked position. An elastomeric shroud 216 may cover the elastomeric element and a portion of the fingers 204, 208 and provide a seal against dirt and debris and acts as a buffer between the lock body 108 of the security apparatus 100 and the portable electronic device 104. When in the unlocked position, the fingers 204, 208 are positioned radially inward so that the fingers 204, 208 are spaced apart from and disengage the portable electronic device 104 (FIG. 11). In this position, the lock tip 112A can be inserted into and removed from a slot 104A in the device 104. When in the locked position, the fingers 204, 208 are moved (e.g., pivoted) away from each other and radially outward relative to the body 200. In this position, the fingers 204, 208 engage the portable electronic device 104 to secure the lock tip 112 to the device 104.

Figure 6:
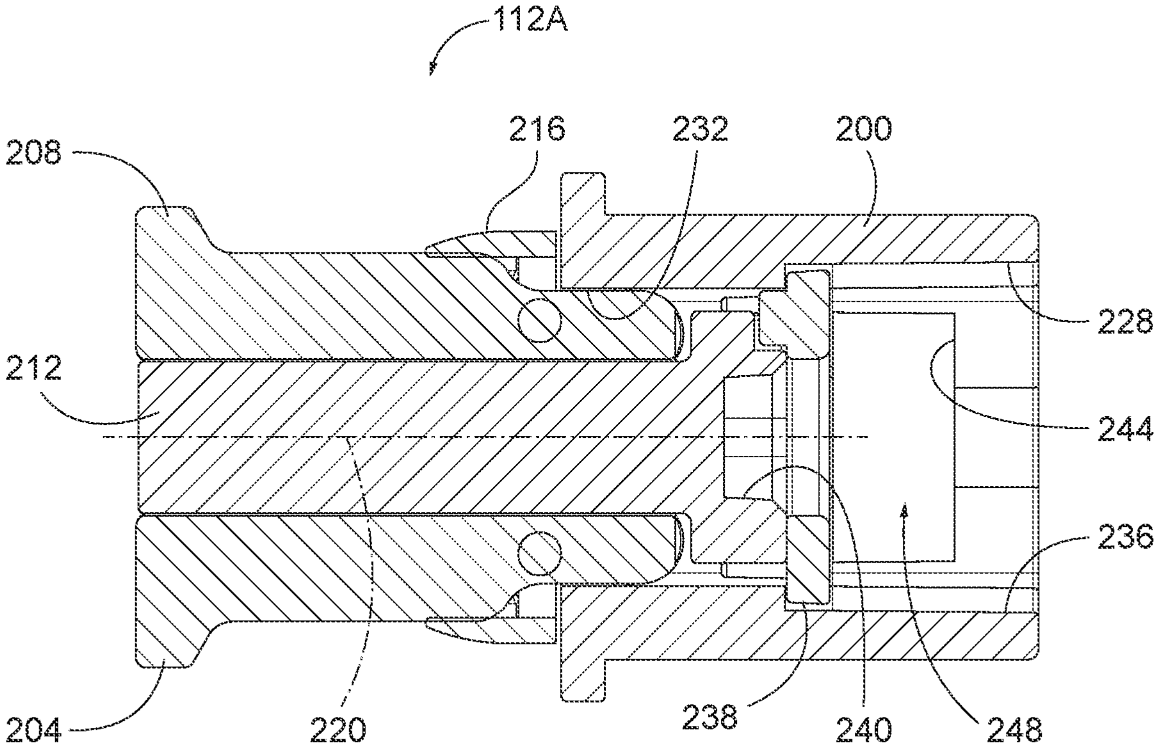
FIG. 6 is a cutaway view of the lock tip of the security apparatus of FIG. 1.
Figure 7:
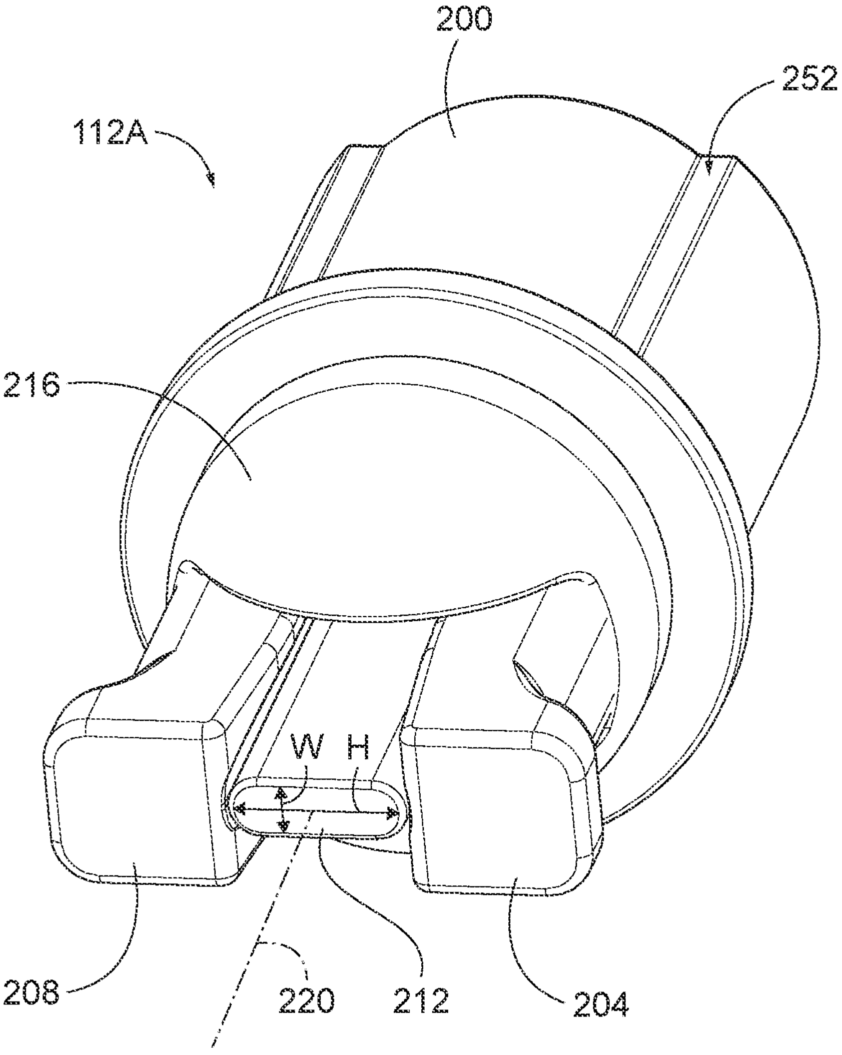
FIG. 7 is a perspective view of the lock tip of the security apparatus of FIG. 1.

The illustrated paddle 212 rotates about a rotational axis 220 (FIG. 6). When the lock tip 112A is coupled to the lock body 208, the rotational axis 220 is parallel to or, as shown, colinear with the rotational axis 160 of the actuator 148. As shown in FIG. 7, the paddle 212 includes a non-circular (e.g., obround, rectangular, elongated oval) cross-section (perpendicular to its rotational axis 220), having a width W that varies significantly from a height H. For example, as shown, the width W may be less than half of the height H. In other embodiments, the width may be less than a quarter of the height or less than a third of the height. As a result of the discrepancy between the width W and height H of the cross-section of the paddle 212, when the paddle 212 rotates a quarter-rotation from the unlocked position, the paddle 212 applies a radial force on the fingers 204, 208, pivoting the fingers 204, 208 radially outward into the locked position, as shown in FIG. 7.

Figure 8:
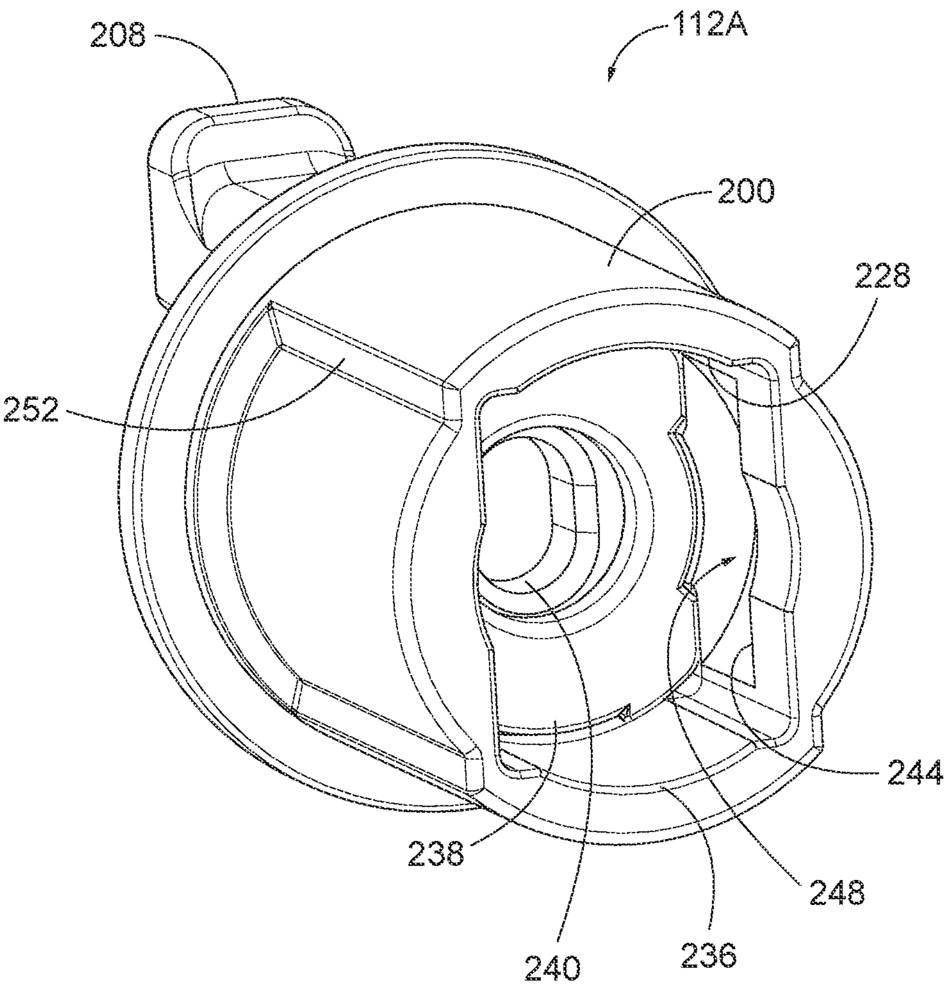
FIG. 8 is another perspective view of the lock tip of the security apparatus of FIG. 1.
Figure 9:
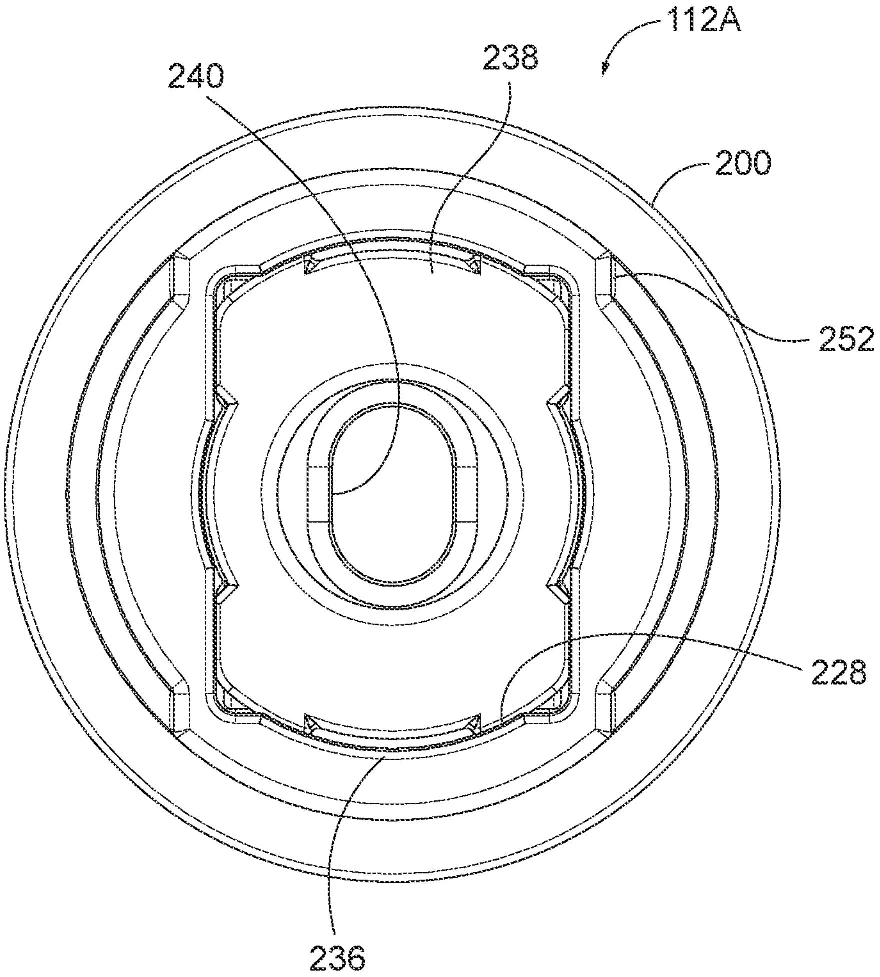
FIG. 9 is a plan view of the lock tip of the security apparatus of FIG. 1.

As shown in FIGS. 6, 8, and 9, the body 200 of the lock tip 112A includes a chamber 228 for receiving the engagement features 168, 172 of the actuator 148. Further, the chamber 228 extends to both axial ends of the body 200 such that the body 200 is a hollow tube having a first opening 232 of the chamber 228 at one axial end and a second opening 236 of the chamber 228 at the opposite axial end. The fingers 204, 208 and rotatable paddle 212 extend through the first opening 232 and are held within the opening 232 relative to the body 200 by an assembly plate 238. The actuator 148 extends through the second opening 236 such that both of the first and second engagement features 168, 172 are located within the chamber 228.

Within the chamber 228, the paddle 212 includes an obround recess 240 sized to receive the first engagement feature 168 when the lock tip 112A is positioned in the lock tip chamber 184 of the lock body 208. If the first engagement feature is shaped or sized differently (rectangular, elongated oval, cross, star, etc), the recess 240 is additionally shaped or sized differently to match. The first engagement feature 168 functions as a key in a keyway such that rotation of the first engagement feature 168 results in similar (e.g., matching) rotation of the paddle 212 between the locked and unlocked positions.

As shown in FIG. 8, the chamber 228 includes a shelf or backstop 244. The shelf 244 partially defines a pocket 248, or undercut, within the chamber 228 that is at the radial periphery of the body 200 and terminates axially prior to the axial end of the body 200. As shown, the body 200 of the lock tip 112A includes two shelves 244 and pockets 248 diametrically opposed to one another. When the actuator 148 is in the second position, the second engagement feature 172 extends axially past the shelf, but the lock tip 112A remains removable from the lock body 108, and as such, the second engagement feature does not extend into the pockets 248. When the actuator 148 is rotated to the first position, the second engagement feature 172 rotates into the pocket 248, thereby preventing axial movement of the lock tip 112A relative to the lock body 208. In the first position, the first engagement feature 168 has rotated the paddle 212 to the locked position such that the lock tip 112A cannot be removed from the portable electronic device 104 and the second engagement feature 172 has rotated into the pockets 248 such that the lock tip 112A cannot be removed from the lock body 208. As such, the portable electronic device 104 is locked to the immovable object via the security apparatus 100.

As shown in FIGS. 8-9, the outer surface of the body 200 of the lock tip 112A additionally includes an alignment feature 252 in the form of cut outs or grooves that mate with a mating (though opposite) alignment feature 192 (FIG. 3) within the lock tip chamber 184. The alignment features 192, 252 facilitate insertion of the lock tip 112*a* into the lock body 108 in the correct orientation such that the engagement features 168, 172 are seated properly within the lock tip 112A.

Figure 13:
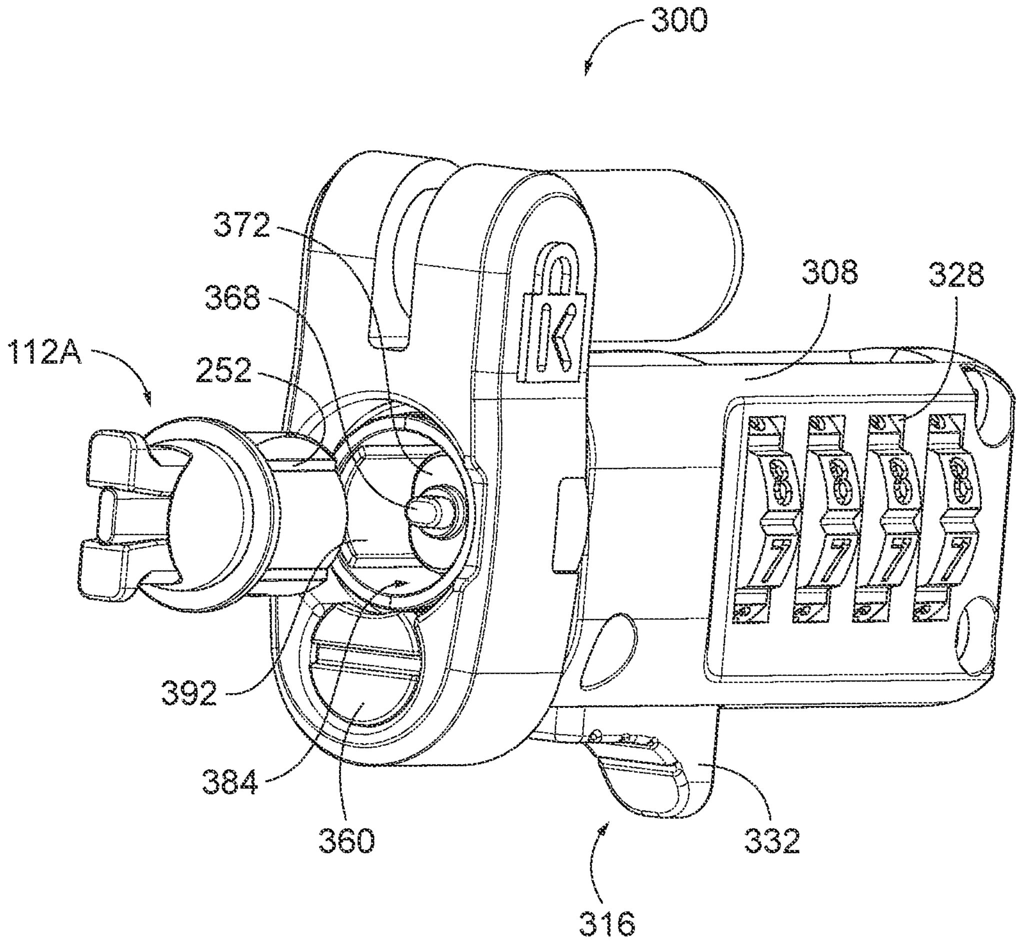
FIG. 13 is a partially exploded perspective view of the security apparatus of FIG. 12.
Figure 14:
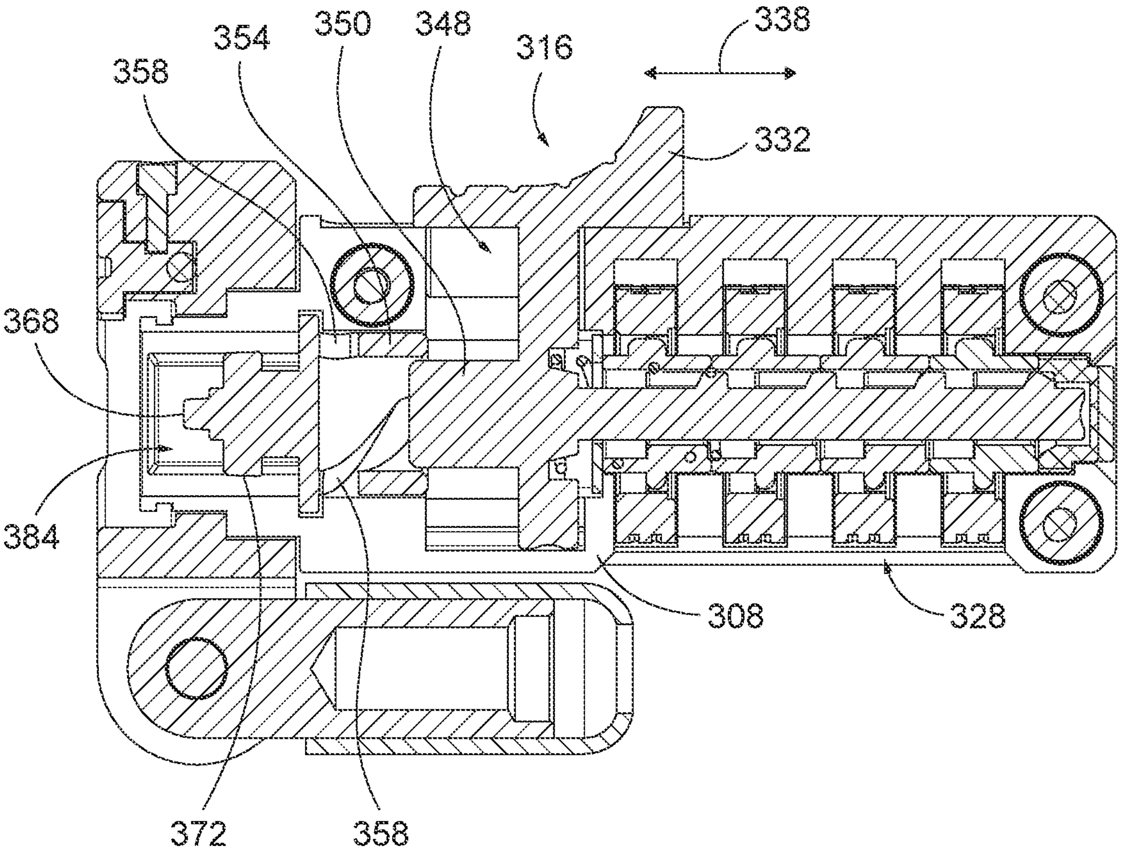
FIG. 14 is a cutaway view of the lock body of the security apparatus of FIG. 12.

Referring back to FIGS. 3-4, a retainer 260 is coupled to the lock body 108 adjacent to the lock tip chamber 184. The illustrated retainer 260 is movable between a holding position (FIGS. 3-4) and a release position. The release position is shown with respect to the embodiment shown in FIG. 13, as described in greater detail below. In the illustrated embodiment, the retainer 260 is rotatable between the holding position and the release position. In other embodiments, the retainer 260 may be linearly slidable between the holding position and the release position. The illustrated retainer 260 is secured to the lock body 108 such that the retainer 260 remains attached to the lock body 108 regardless of its position. In other embodiments, the retainer 260 may be removable from the lock body 108 to move between the holding position and the release position.

In the holding position, the retainer 260 holds the lock tip 112A within the lock tip chamber 184, even when the second engagement feature 172 is not rotated into the pockets 248 of the chamber 228. The lock tip 112A is not locked to the lock body 108 via the retainer 260, as the retainer 260 is readily accessible by anyone. Rather, the retainer 260 holds the lock tip 112A and lock body 108 together to inhibit accidental disassembly. In the release position, the retainer 260 permits removal of the lock tip 112A from the lock tip chamber 184. As shown, the retainer 260 is a crescent-shaped body that is rotatable via user interaction. In the release position, the crescent does not block the lock tip chamber 184 and therefore permits insertion and removal of the lock tip 112A from the lock tip chamber 184 if the engagement feature 172 is rotated out of the pockets 248. In the holding position, the crescent is rotated so that it blocks the lock tip chamber 184, thereby inhibiting the removal of the lock tip 112A from the lock tip chamber 184. As shown, the retainer 260 includes a slot 264 that can be gripped by a finger, fingernail, coin, or screwdriver to facilitate rotation of the retainer 260.

Figure 10:
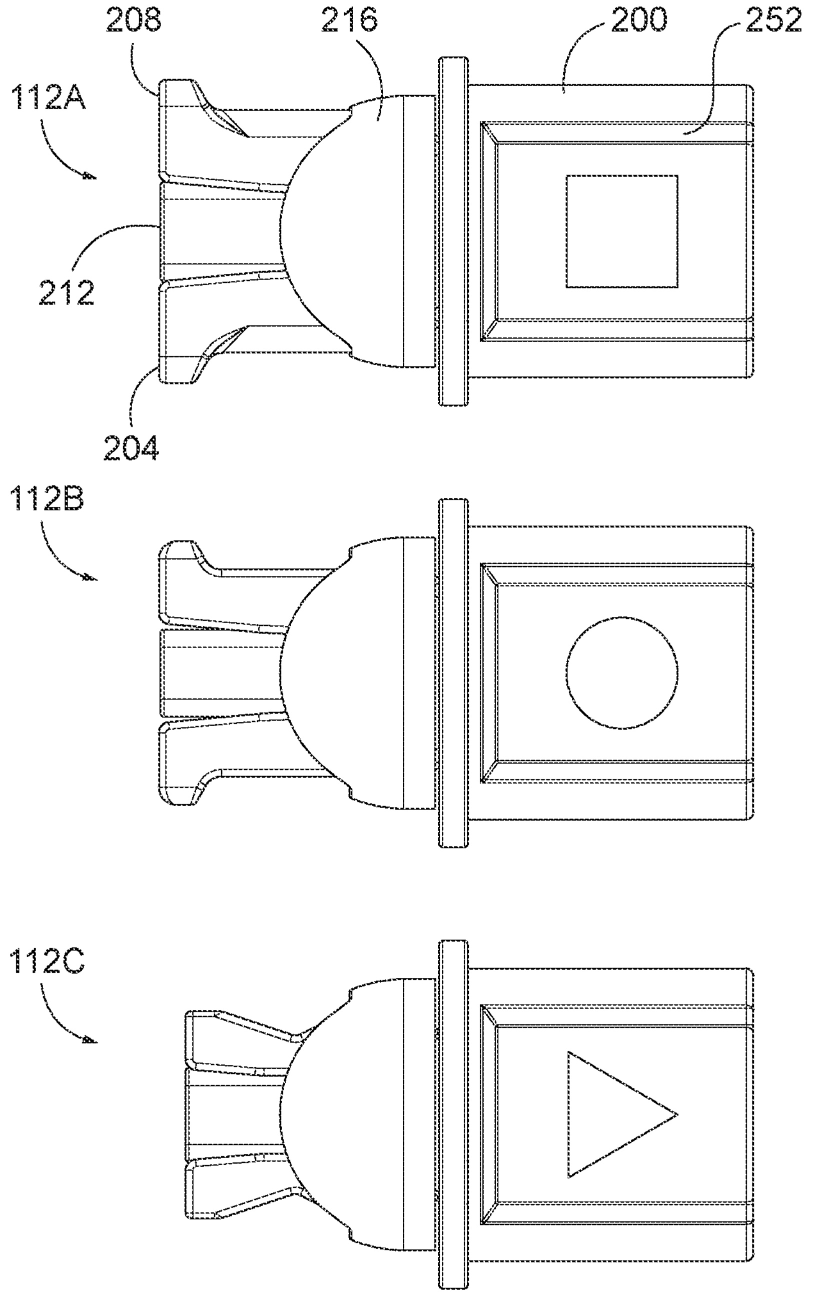
FIG. 10 is a side view of the lock tip of the security apparatus of FIG. 1 alongside alternative lock tips usable with the lock body of the security apparatus of FIG. 1

As shown in FIG. 10, the lock tip 112A is one of a plurality of lock tips 112A, 112B, 112C that can be inserted into the lock tip chamber 184 of the lock body 108. Therefore, a user can swap out which lock tip 112A, 112B, 112C is used in combination with the lock body 108 to facilitate locking with slots 104A of different shapes and sizes. As shown, the lock tip 112A is sized to engage a large slot, such as the Kensington® Security Slot. The lock tip 112B is sized to engage a smaller slot (relative to the Kensington® Security Slot), such as the Kensington® Nano Security Slot. The lock tip 112C is shaped to engage a wedge lock slot. In other embodiments, the plurality of lock tips may additionally include other configurations of lock tips for use with other types of slots. The lock tips 112A, 112B, 112C may also be referred to as lock heads.

In operation, to lock the portable electronic device 104 with the security apparatus 100, a user fastens the cable 144 around a relatively stationary object with the security apparatus 100 in the unlocked position. The user selects an appropriate lock tip 112A, 112B, 112C to engage the slot 104A of the portable electronic device 104. Using the alignment features 192, 252 as a guide, the lock tip 112 is inserted into the lock tip chamber 184, thereby engaging the first engagement feature 168 with the paddle 212 and inserting the second engagement feature 172 into the chamber 228. The user moves (e.g., rotates) the retainer 260 into the blocking position to hold the lock tip 112A within the lock tip chamber 184. The fingers 204, 208 of the lock tip 112A are inserted into the slot 104A of the portable electronic device 104. The user actuates the locking mechanism by rotating the key 136 within the key opening 132 of the lock cylinder 128, thereby rotating the actuator 148 and engagement features 168, 172. The first engagement feature 168 rotates the paddle 212 from the unlocked position to the locked position, expanding the fingers 204, 208 and locking the lock tip 112A to the portable electronic device 104. At the same time, the second engagement feature 172 rotates into the pockets 248, thereby locking the lock tip 112A to the lock body 108.

To unlock the portable electronic device 104 from the security apparatus 100, the user rotates the key 136 within the lock cylinder 128 from the first, locked position to the second, unlocked position, thereby rotating the actuator 148 and engagement features 168, 172. The first engagement feature 168 rotates the paddle 212 from the locked position to the unlocked position, retracting the fingers 204, 208 radially inward, thereby unlocking the lock tip 112A from the portable electronic device 104. At the same time, the second engagement feature 172 rotates out of the pockets 248, thereby unlocking the lock tip 112A from the lock body 108. With the retainer 260 rotated into the holding position, the lock tip 112A remains within the lock body 108. If replacing the lock tip 112A is desired, the retainer 260 is moved (e.g., rotated) to the release position and the lock tip 112A is removable from the lock body 108.

FIGS. 12-15 illustrate another security apparatus 300. The security apparatus 300 and lock body 308 are similar to the security apparatus 100 and lock body 108 discussed above with reference to FIGS. 1-5. Further, the security apparatus 300 uses the same lock tips 112A, 112B, 112C shown in greater detail in FIGS. 6-11. Reference is made to the description of the security apparatus 100 above for details of the structure and operation of the security apparatus 300 not included below. The illustrated security apparatus 300 includes a lock body 308, a lock tip 112A that is removable from the lock body 308, and an actuator assembly 316.

Whereas the security apparatus 100 includes a key-operated lock cylinder 128, the security apparatus 300 includes a locking mechanism in the form of a combination lock 328. The illustrated combination lock 328 requires a four-digit PIN (personal identification number) for locking and unlocking the security apparatus 300. When the correct PIN is entered into the combination lock 328, a manual interface 332 is movable relative to the lock body 308. In the illustrated embodiment, the manual interface 332 is a slider. In other embodiments, the manual interface 332 may be a push-button, a lever, a rotatable dial, and the like. The illustrated slider 332 is constrained to linear motion along a lengthwise direction 338 relative to the lock body 308. When the PIN is scrambled and incorrectly identified, the slider 332 is not movable relative to the lock body 308.

Figure 15:
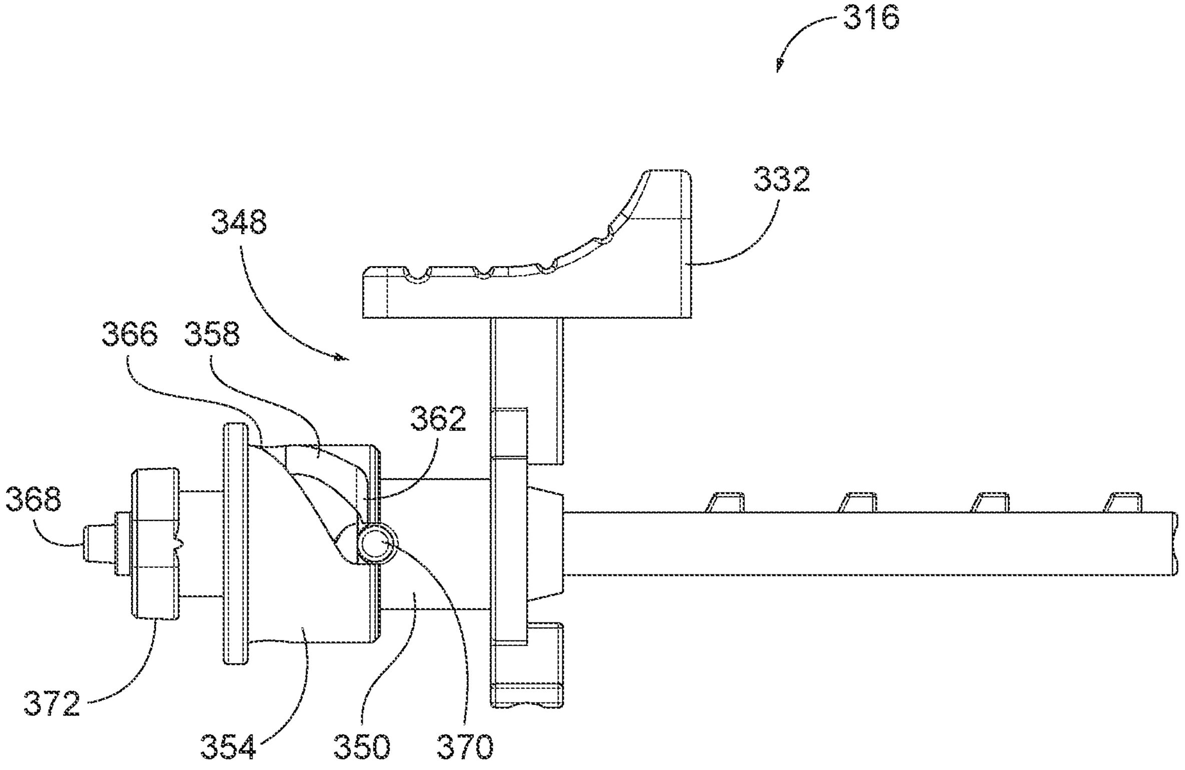
FIG. 15 is a side view of the actuator assembly of the security apparatus of FIG. 12.

The actuator assembly 316 includes the slider 332 and additionally includes an actuator 348 coupled to the slider 332. The actuator 348 includes a first portion forming a pin or cam 350 and a second portion forming a follower 354 having a slot 358. As shown, the cam 350 of the actuator 348 and the slider 332 are integrally formed as a single component such that translation of the slider 332 results in translation of the cam 350. The cam 350 may include one or more cam members 370 that interact with the cam follower 354. The cam follower 354 has one or more slots 358 (as shown, two slots 358), formed as arcuate slots that curve around the circumference of the cam follower 354. In other embodiments, the shape of the cam follower slot can be alternatively shaped, such as purely helical, etc. The slots 358 are also obliquely angled relative to the longitudinal axis 360 so that the slots 358 helically wind around the cam follower 354. As shown in FIG. 15, each slot 358 includes a first end 362 nearer the combination lock 328, and a second end 366 opposite the first end 362. Each cam member 370 is positioned within one of the slots 358, thereby coupling the cam 350 to the cam follower 354. The cam follower 354 is constrained to prevent translation of the cam follower 354 relative to the lock body 308, though the cam follower 354 is permitted to rotate relative to the lock body 308.

The cam follower 354 additionally includes first and second engagement features 368, 372, similar to the engagement features 168, 172 (FIG. 3) for engaging the lock tips 112A, 112B, 112C within a lock tip chamber 384.

When the slider 332 is movable (by way of the correct PIN in the combination lock 328), movement from a first, locked position to a second, unlocked position involves translating the slider 332 along the lengthwise direction 338 of the actuator 348. As the slider 332 is coupled to the cam 350, the cam 350 is likewise translated relative to the lock body 308. The cam 350 rotates the cam follower 354 as the cam members 370 translate axially within the oblique slots 358, thereby also rotating the first and second engagement features 368, 372 from an unlocked position to a locked position. Rotating the first and second engagement features 368, 372 to the locked position locks the lock tip 112A to the portable electronic device 104 and to the lock body 308.

In some embodiments, the slider 332 may be biased toward the unlocked position and may be held in the locked position by sliding the slider 332 and scrambling the PIN, thereby holding the slider in the locked position. In other embodiments, the slider 332 may be unbiased toward either the locked position or the unlocked position and instead is moved between locked and unlocked positions by hand as permitted based on the correct PIN. In further embodiments, the slider 332 may be biased toward the locked position and may be held in the unlocked position temporarily when connecting one of the lock tips 112A, 112B, 112C. In some embodiments, the slider may be replaced by an alternative mechanism interface such as a rotation dial, a switch lever, or a button.

In operation, to lock the portable electronic device 104 with the security apparatus 300, a user fastens the cable 344 around a relatively stationary object. The user selects an appropriate lock tip 112A, 112B, 112C to engage the slot 104A of the portable electronic device 104. The PIN is set so that the locking mechanism is in the unlocked position. The locking mechanism needs to be actuated and held in the unlocked position in order to positively insert the lock tip 112A. Using the alignment features 392, 252 as a guide, the lock tip 112A is inserted into the lock tip chamber 384, thereby engaging the first engagement feature 368 with the paddle 212 and inserting the second engagement feature 372 into the chamber 228. The user moves (e.g., rotates) the retainer 360 into the blocking position to hold the lock tip 112A within the lock tip chamber 384. The fingers 204, 208 of the lock tip 112A are inserted into the slot 104A of the portable electronic device 104. The user actuates the locking mechanism by entering the PIN into the combination lock 328 and translating the slider 332, thereby translating the cam 350, and rotating the cam follower 354 and the engagement features 368, 372 coupled to the cam follower 354. The first engagement feature 368 rotates the paddle 212 from the unlocked position to the locked position, expanding the fingers 204, 208 and locking the lock tip 112A to the portable electronic device 104. At the same time, the second engagement feature 372 rotates into the pockets 248, thereby locking the lock tip 112A to the lock body 308. The user scrambles the combination lock 328 to prevent the slider 332 from moving from the locked position to the unlocked position by an unauthorized user.

To unlock the portable electronic device 104 from the security apparatus 300, the user enters the PIN into the combination lock 328, moving the slider 332 from the first, locked position to the second, unlocked position, thereby translating the cam 350 and rotating the cam follower 354 and engagement features 368, 332. The first engagement feature 368 rotates the paddle 212 from the locked position to the unlocked position, retracting the fingers 204, 208 radially inward, thereby unlocking the lock tip 112A from the portable electronic device 104. At the same time, the second engagement feature 372 rotates out of the pockets 248, thereby unlocking the lock tip 112A from the lock body 308. With the retainer 360 rotated into the holding position, the lock tip 112A remains within the lock body 308. If replacing the lock tip 112A is desired, the retainer 360 is moved (e.g., rotated) to the release position and the lock tip 112A is removable from the lock body 308.

Figure 16:
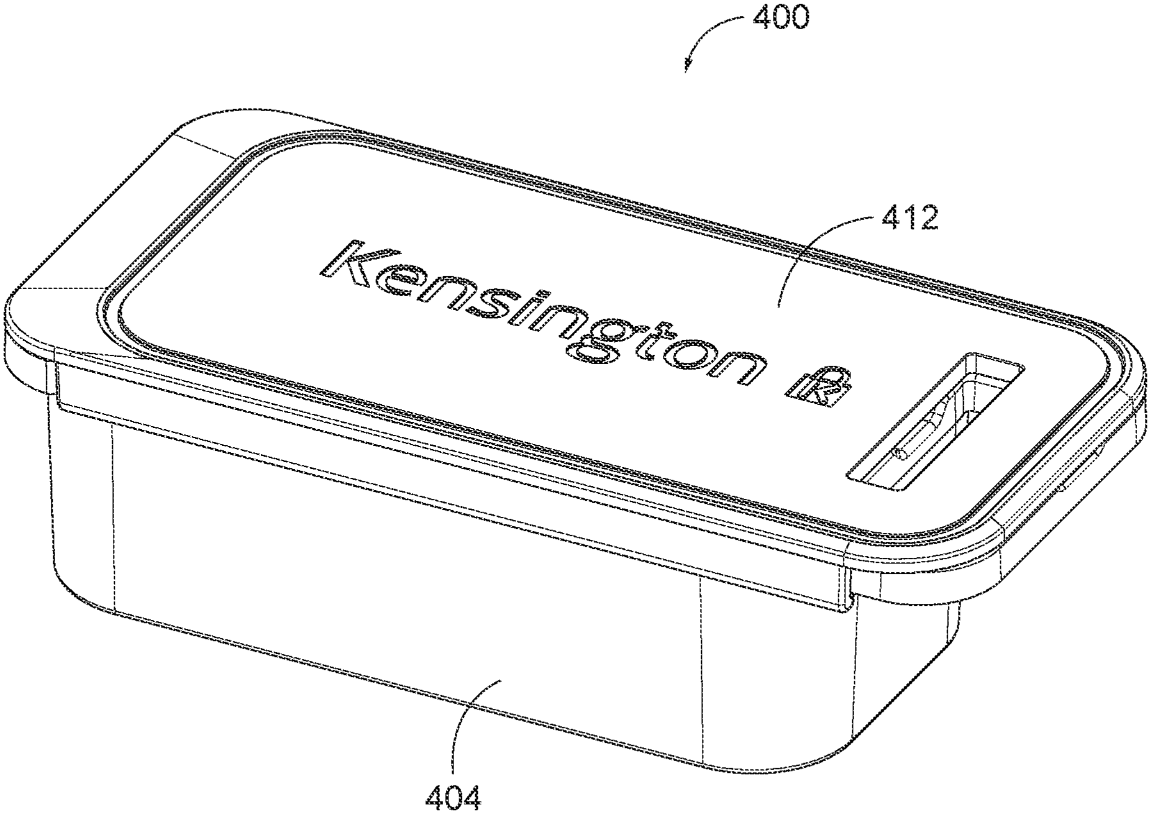
FIG. 16 is a perspective view of a case having a cover, the case for the lock tips shown in FIG. 10.
Figure 17:
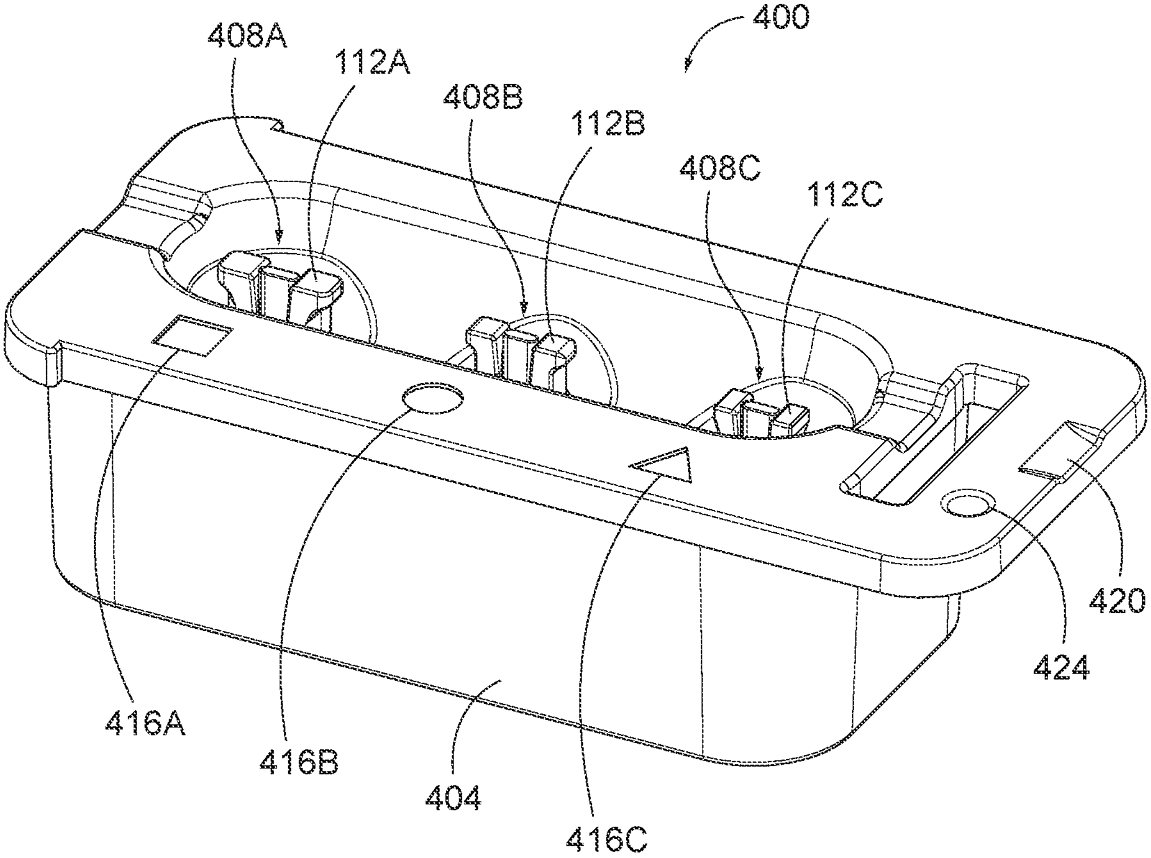
FIG. 17 is a perspective view of the case of FIG. 16 without the cover.
Figure 18:
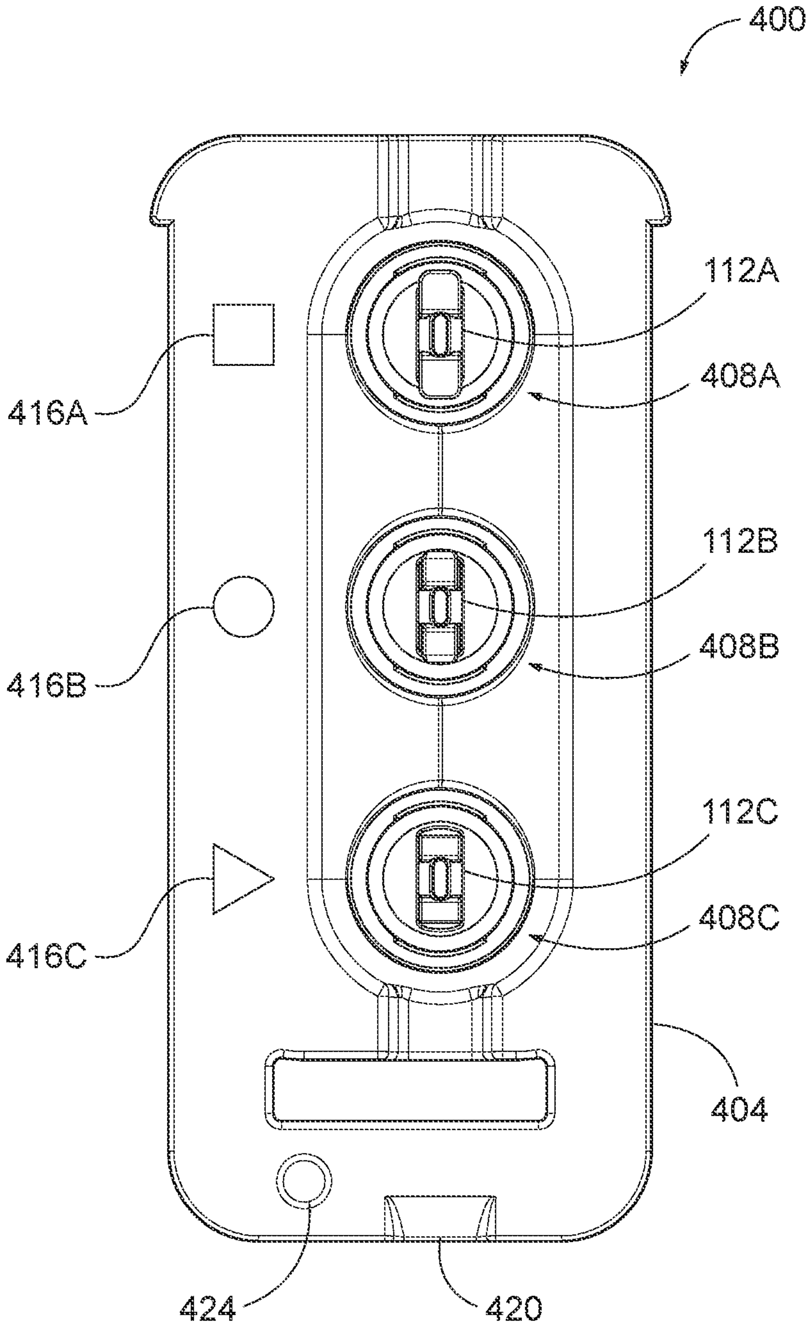
FIG. 18 is a top view of the case of FIG. 16 without the cover.

FIGS. 16-18 illustrate a storage case 400 for the three lock tips 112A, 112B, 112C shown in FIG. 10. The storage case 400 includes a caddy 404 having individual storage locations 408A, 408B, 408C for the individual lock tips 112A, 112B, 112C, respectively. Additionally, as shown in FIG. 16, the storage case 400 includes a cover 412 that is slidably coupled to the caddy 404. A detent 424 is located on one or both of the caddy 404 and the cover 412 to maintain the position of the cover relative to the caddy 404 until a sliding force overcomes the force of the detent 424 to remove the cover 412 from the caddy 404. An indicia 416A, 416B, 416C is adjacent each storage location 408A, 408B, 408C, respectively, identifying which of the lock tips 112A, 112B, 112C is intended for each location 408A, 408B, 408C. A snap feature 420 is located on one or both of the caddy 404 and the cover 412 to couple the cover 412 to the caddy 404 without assembly screws or fastener hardware, etc.

Various features and advantages of the invention are set forth in the following claims.

What is claimed is:

1. A security apparatus for a portable electronic device, the security apparatus comprising:

a lock body;

an actuator assembly supported by the lock body, the actuator assembly having an engagement feature configured to rotate between a first position and a second position; and a lock tip removably coupled to the lock body, the lock tip configured to selectively engage the portable electronic device, wherein the lock tip is movable by the actuator assembly between a locked position, in which the lock tip is secured to the portable electronic device, and an unlocked position, in which the lock tip is unsecured from the portable electronic device;

wherein rotating the engagement feature from the second position to the first position locks the lock tip to the lock body and concurrently locks the lock tip to the portable electronic device, and wherein rotating the engagement feature from the first position to the second position unlocks the lock tip from the lock body and concurrently unlocks the lock tip from the portable electronic device, wherein the lock tip includes a pocket, and wherein the engagement feature of the actuator assembly rotates into the pocket to lock the lock tip to the lock body in the first position and rotates out of the pocket to unlock the lock tip from the lock body in the second position.

2. The security apparatus of claim 1, further comprising a locking mechanism coupled to the actuator assembly, wherein the actuator assembly is configured to rotate the engagement feature in response to actuation of the locking mechanism.

3. The security apparatus of claim 1, wherein the lock tip is positioned within a lock tip chamber defined by the lock body when the lock tip is coupled to the lock body.

4. The security apparatus of claim 1, wherein the lock tip comprises a first finger, a second finger, and a paddle positioned between the first and second fingers.

5. The security apparatus of claim 4, wherein the engagement feature includes an obround engagement feature that selectively engages a recess of the lock tip to transmit rotation of the engagement feature into rotation of the paddle.

6. The security apparatus of claim 4, further comprising a locking mechanism coupled to the actuator assembly, wherein the engagement feature is configured to rotate in response to actuation of the locking mechanism, and wherein, when the lock tip is coupled to the lock body, actuation of the locking mechanism results in rotation of the paddle.

7. The security apparatus of claim 1, further comprising a retainer separate from the actuator assembly and configured to move between a holding position and a release position, wherein, in the holding position, the retainer holds the lock tip relative to the lock body, and wherein in the release position, the retainer permits the lock tip to be removed from the lock body.

8. The security apparatus of claim 7, wherein the lock tip is positioned within a lock tip chamber defined by the lock body when the lock tip is coupled to the lock body, and wherein the retainer has a cutout such that in the release position, the retainer does not block the lock tip chamber, and in the holding position, the retainer blocks a portion of the lock tip chamber.

9. The security apparatus of claim 7, wherein the retainer is accessible when the lock tip is in the unlocked position and in the locked position.

10. A security apparatus for a portable electronic device, the security apparatus comprising:

a lock body;

an actuator assembly supported by the lock body, the actuator assembly configured to move between a first position and a second position;

a lock tip removably coupled to the lock body, the lock tip configured to selectively engage the portable electronic device, wherein the lock tip is movable by the actuator assembly between a locked position, in which the lock tip is secured to the portable electronic device, and an unlocked position, in which the lock tip is unsecured from the portable electronic device; and a retainer coupled to the lock body and separate from the actuator assembly, the retainer configured to move between a holding position in which the retainer holds the lock tip relative to the lock body, and a release position, in which the retainer permits the lock tip to be removed from the lock body, wherein the retainer is accessible when the lock tip is in the unlocked position and in the locked position.

11. The security apparatus of claim 10, wherein the lock tip is positioned within a lock tip chamber defined by the lock body when the lock tip is coupled to the lock body, and wherein, in the release position, the retainer does not block the lock tip chamber, and in the holding position, the retainer blocks a portion of the lock tip chamber.

12. The security apparatus of claim 10, wherein the retainer is rotatable relative to the lock body between the holding position and the release position.

13. The security apparatus of claim 12, wherein the retainer includes a slot engageable by a user to facilitate rotation of the retainer relative to the lock body.

14. The security apparatus of claim 10, wherein, when the retainer is in the release position and the actuator assembly is in the second position, the lock tip is removable from the lock body, wherein, when the retainer is in the holding position, the lock tip is not removable from the lock body regardless of the position of the actuator assembly, and wherein, when the actuator assembly is in the first position, the lock tip is not removable from the lock body regardless of the position of the retainer.

15. The security apparatus of claim 10, wherein the lock tip comprises a first finger, a second finger, and a paddle positioned between the first and second fingers.

16. The security apparatus of claim 15, further comprising a locking mechanism coupled to the actuator assembly, wherein an engagement feature of the actuator assembly is configured to rotate in response to actuation of the locking mechanism, and wherein, when the lock tip is coupled to the actuator assembly, rotation of the engagement feature results in rotation of the paddle.

17. The security apparatus of claim 10, wherein the lock tip includes a pocket, and wherein an engagement feature of the actuator assembly rotates into the pocket to lock the lock tip to the lock body in the first position and rotates out of the pocket to unlock the lock tip from the lock body in the second position.

18. The security apparatus of claim 10, wherein the lock tip is selectively positioned within a lock tip chamber defined by the lock body, and wherein, in the holding position, the retainer prohibits insertion or removal of the lock tip into the lock tip chamber.

19. A security apparatus for a portable electronic device, the security apparatus comprising:

a lock body;

an actuator assembly supported by the lock body, the actuator assembly configured to move between a first position and a second position;

a lock tip removably coupled to the lock body, the lock tip configured to selectively engage the portable electronic device, wherein the lock tip is movable by the actuator assembly between a locked position, in which the lock tip is secured to the portable electronic device, and an unlocked position, in which the lock tip is unsecured from the portable electronic device; and a retainer coupled to the lock body and separate from the actuator assembly, the retainer configured to move between a holding position in which the retainer holds the lock tip relative to the lock body, and a release position, in which the retainer permits the lock tip to be removed from the lock body, wherein the retainer is rotatable relative to the lock body between the holding position and the release position, and wherein the retainer includes a slot engageable by a user to facilitate rotation of the retainer relative to the lock body.

20. A security apparatus for a portable electronic device, the security apparatus comprising:

a lock body;

an actuator assembly supported by the lock body, the actuator assembly configured to move between a first position and a second position;

a lock tip removably coupled to the lock body, the lock tip configured to selectively engage the portable electronic device, wherein the lock tip is movable by the actuator assembly between a locked position, in which the lock tip is secured to the portable electronic device, and an unlocked position, in which the lock tip is unsecured from the portable electronic device; and a retainer coupled to the lock body and separate from the actuator assembly, the retainer configured to move between a holding position in which the retainer holds the lock tip relative to the lock body, and a release position, in which the retainer permits the lock tip to be removed from the lock body, wherein the lock tip includes a pocket, and wherein an engagement feature of the actuator assembly rotates into the pocket to lock the lock tip to the lock body in the first position and rotates out of the pocket to unlock the lock tip from the lock body in the second position.

* * * * *